(12) United States Patent  
Moisel et al.

(10) Patent No.: US 7,029,031 B2  
(45) Date of Patent: Apr. 18, 2006

(54) METHOD AND DEVICE FOR DETECTING THE POSITION AND THE POSTURE OF A HUMAN BODY

(75) Inventors: Joerg Moisel, Neu-Ulm (DE); Manfred Rode, Senden (DE)

(73) Assignee: DaimlerChrysler AG, Stuttgart (DE)

( * ) Notice: Subject to any disclaimer, the term of this patent is extended or adjusted under 35 U.S.C. 154(b) by 238 days.

(21) Appl. No.: 10/615,372

(22) Filed: Jul. 8, 2003

(65) Prior Publication Data

US 2004/0007681 A1 Jan. 15, 2004

(30) Foreign Application Priority Data

Jul. 9, 2002 (DE) ................. 102 31 016

(51) Int. Cl.
*B60R 21/16* (2006.01)

(52) U.S. Cl. ............... 280/735; 250/221; 250/DIG. 1; 340/573.7; 356/622; 701/45

(58) Field of Classification Search ............... 280/735; 180/272; 701/45; 340/555, 556, 557, 573.7; 250/221, DIG. 1; 356/614, 622

See application file for complete search history.

(56) References Cited

U.S. PATENT DOCUMENTS

| | | | |
|---|---|---|---|
| 5,118,134 A | 6/1992 | Mattes et al. | 280/735 |
| 5,439,249 A | 8/1995 | Steffens, Jr. et al. | 280/735 |
| 5,490,069 A * | 2/1996 | Gioutsos et al. | 280/735 |
| 5,585,625 A * | 12/1996 | Spies | 340/556 |
| 6,113,137 A | 9/2000 | Mizutani et al. | 280/735 |
| 6,220,627 B1 * | 4/2001 | Stanley | 280/735 |
| 6,298,311 B1 * | 10/2001 | Griffin et al. | 280/735 |
| 2002/0070538 A1 * | 6/2002 | Yasui | 280/735 |

FOREIGN PATENT DOCUMENTS

| | | |
|---|---|---|
| DE | 4005598 | 8/1991 |
| DE | 4023109 | 1/1992 |
| DE | 19547333 A1 * | 6/1997 |
| DE | 19749855 | 6/1999 |
| EP | 0484293 | 1/1994 |
| EP | 0963887 | 12/1999 |
| JP | 10100854 A * | 4/1998 |
| JP | 10129418 A * | 5/1998 |
| WO | 0246003 | 6/2002 |

* cited by examiner

*Primary Examiner*—Eric Culbreth
(74) *Attorney, Agent, or Firm*—Davidson, Davidson & Kappel, LLC (57) ABSTRACT

In a device for detecting the body position of a passenger in a vehicle sitting in a seat a plurality of light transmitters is situated in or on the back rest, staggered by height, and emit light signals in the direction of one or a plurality of light receiver(s) situated in particular above the back rest. A conclusion may be drawn regarding the form of the blockage of the light signals by the passenger based on the light signals received, which in turn makes it possible to draw a conclusion regarding the posture, in particular the head position or the body inclination. The positions of the light transmitters and light receivers may be exchanged in an analogous manner.

49 Claims, 9 Drawing Sheets

METHOD AND DEVICE FOR DETECTING THE POSITION AND THE POSTURE OF A HUMAN BODY

Priority is claimed to German Patent Application No. 102 31 016.5-21, the subject matter of which is hereby incorporated by reference herein.

The present invention relates to a method and a device for detecting the body position and the posture of a passenger in a vehicle sitting in a seat having a back rest.

BACKGROUND

A sensor for detecting the presence of a passenger in a vehicle sitting in a seat having a back rest is known from European Patent 484 293 B1, the sensor having an infrared-sensitive element and a lens system and being situated in the roof liner above the seat. The heat radiation of a passenger is detected by the infrared-sensitive element, allowing a conclusion to be drawn regarding the presence of a passenger.

A device for detecting the presence or the body position of a passenger in which an infrared transmitter and an infrared receiver are accommodated in a housing situated in the roof liner is known from U.S. Pat. No. 6,113,137. The infrared light, emitted by the infrared transmitter and reflected by the seat or by any passengers present, is picked up by the infrared receiver in the common housing and is analyzed. Within the scope of analyzing the intensity of the light reflected or its variation, the size class of the passenger (small, big) and the class of the sitting position (very dangerous position, possibly dangerous position, correct position) are identified or the presence of a passenger is detected.

Furthermore, a method of determining the body position in which the length by which a seat belt is rolled off vis-à-vis its rest position is determined is known from German Patent Application 197 49 855 A1. The body position of the passenger is identified based on this length.

These methods described have the common feature that they either operate very inaccurately, or are very complex in their analysis or in the implementation of the object

SUMMARY OF THE INVENTION

An object of the present invention is to provide a method and a device for detecting the body position which preferably does not have the disadvantages mentioned above.

The present invention provides a method of detecting the body position of a passenger in a vehicle sitting in a seat, in which light signals are emitted by one light transmitter or a plurality of light transmitters, in which light signals are picked up by one light receiver or a plurality of light receivers, in which light signals are blocked between a light transmitter and a light receiver as a function of the sitting position of a passenger, wherein a conclusion is drawn regarding the posture, in particular the body inclination and/or the head position of the passenger, based on the light signals received.

The method according to the present invention of detecting the body position or posture of a passenger sitting in a driver's seat is characterized in that light signals are emitted by one or a plurality of light transmitters, the light signals emitted are picked up by one or a plurality of light receivers, the light signals, being blocked or not blocked between a light transmitter and a light receiver depending on the sitting position of a passenger, and a conclusion is drawn regarding the body position or posture of the particular passenger based on the light signals received. This simple approach represents reliable and specific detection of interruptions of the light propagation paths and thus detection of the body position or posture of the passenger. The present invention takes advantage of the fact that as soon as the passenger has assumed a certain body position or posture, a light connection between the light transmitter and the light receiver is blocked, until the passenger assumes a body position given from the analytical standpoint by an unblocked light path. Due to the differentiated possibility of determining whether individual light paths between individual light transmitters and light receivers are blocked or not, it may be ascertained whether certain sitting positions in the seat are taken or are not taken by the passenger according to his body position or posture. The inclination of the body or the head position of the passenger may be determined according to the present invention.

The use of a suitable system of light transmitters and light receivers, in particular a system which enables a fan-shaped arrangement of the light paths, may result in a reliable and meaningful evaluation of the sitting position, i.e., in particular with regard to the presence of a passenger, or the body inclination and the head position. It has proven advantageous to position the light transmitters and/or the light receivers in or on the seat, so that a functional unit having a reliable analytical capability is created. Within the scope of the analysis, it has proven advantageous in particular to achieve a differentiation of the light signals by examining their intensity or by individually identifying the individual light signals of the individual light transmitters using differences in modulation, frequency, color, or timing, etc.

The present invention provides a device for detecting the body position or posture of a passenger in a vehicle sitting in a seat having a back rest with a plurality of light transmitters for emitting light signals being situated staggered by height in the back rest of the seat. At least one light receiver is situated in the area which is illuminated by the light transmitter, the light receiver being suited to receive light signals of the light transmitter and to supply them to an analyzing unit for analysis. Within the scope of the analysis, the body position or the posture is identified based on the type or intensity of the light signals received. The present invention uses the idea that, when the body interrupts the light signal, a modification of the light signals, receivable by the light receiver or the light receivers, takes place, making it possible to identify the body position or posture of the passenger in a simple manner and with adequate reliability.

The light receiver or light receivers are preferably situated in such a way that they may simultaneously receive the light signals of multiple light transmitters and supply them to the analyzing unit. By reducing the number of light receivers the design of the device is simplified according to the present invention, and in particular the extent of wiring is reduced.

It has proven advantageous in particular to position the light receivers above the light transmitters which are situated in the back rest of the seat staggered by height, which makes a differentiated evaluation of the body position or posture in the horizontal direction possible, in particular with regard to the passenger's distance from the back rest. It has proven advantageous in particular to position at least one light receiver in the head restraint or in the roof area above the head restraint in such a way that a differentiated detection of the passenger's distance from the back rest is made possible over the entire length of the passenger's back or over the essential part of the passenger's back. This makes a meaningful evaluation of the body position possible.

On the basis of the body position detected, which also includes information about the presence of a passenger, the deployment in particular, i.e., the form of deployment of an air bag, in particular a head air bag, may be specifically controlled in such a way that the injury risk from improper deployment is markedly limited. This may be achieved to a particular extent by the simple and reliable evaluation of the body position, in particular the head position.

In another embodiment of the present invention, one or a plurality of light receivers for receiving light signals is situated in or on the back rest of the seat, staggered by height. The light signals, received by the light receivers, are supplied to an analyzing unit which analyzes the light signals received to the effect that the body position or posture is identified based on the light signals received.

One or multiple light transmitters which are situated in the receiving area of the light receivers preferably generate the light signals received. This makes it possible to supply the light transmitters' light signals, which show a sharp contrast with respect to the ambient light, to the light receiver or light receivers, thus making a reliable analysis with regard to the body position or posture possible.

In addition to artificially generating the light signals using light transmitters, it is also possible to use the prevalent ambient light as light signals, in particular the light available through the windows of the vehicle or as scattered light. In this case, it proved to be a effective and simple form of analysis to check which of the light receivers staggered by height does receive or does not receive a light signal of adequate intensity, i.e., having a light intensity greater than a predefined limit value. This makes it possible to decide which of the light receivers is concealed, in particular by the body of the passenger, or which is not concealed due to the inclination or distance of the body and may thus receive light or light signals of adequate intensity. This embodiment of the present invention has proved to be a simple and effective device for detecting the body position or posture.

It has proven advantageous in particular to design the light transmitters in such a way that each light transmitter emits a light transmitter-individualized light signal, so that it is particularly simple for the analyzing unit to analyze which light path between the light transmitters and light receiver is blocked, and thus which position the passenger has assumed. In this connection it has proven advantageous in particular to achieve light transmitter individualization by differentiating the color, i.e., frequency, modulation, and/or pause length-to-pulse length ratio of the light of the individual transmitters, and/or by individual coding. This light transmitter-individualized design of the light signals makes it possible to detect the individual light signals in a simple way and thus reliably, and to come to the conclusion which light signals/light paths are blocked and which reach the light receivers and thus the analyzing unit freely. Based on all light signals received and based on the blocked light signals, the analyzing unit, aware of the position of the different light transmitters and light receivers and the associated light signals, may come to a reliable conclusion about the body position or the posture of the passenger.

In addition, it has proven advantageous to activate the different light transmitters staggered in time so that only one light signal is emitted at a particular point in time, which makes it possible to determine in a simple manner which light path is blocked by the passenger and which is not. The light transmitters are preferably triggered successively so that a differentiated picture about the free light paths and the blocked light paths is created within a short period of time, thus making an analysis of the body position or the posture of the passenger possible. This embodiment shows a simple analysis since typically only one light transmitter or a few light transmitters are activated at a time and thus a very differentiated analysis of the light signals from a large number of light signals received simultaneously is not necessary.

According to another preferred embodiment of the present invention, the analyzing unit is designed in such a way that, based on the light intensity received, it may conclude how many light signals were received and thus, aware of the position of the light transmitters or light receivers which are staggered by height, may draw a conclusion regarding the body position or posture of the passenger. This embodiment has proved to be an advantageous compromise between a reliable conclusion about the body position or posture and a simple and cost-effective design of the device for detecting the body position. Within the scope of the signal analysis, essentially the light intensity of the light signals received is determined and subsequently, based on a table, a conclusion is drawn regarding the body position or posture, the table representing the relationship between the light intensity received and the body position or posture as a function of the predefined positions and the light receivers and light transmitters used. These relationships have been established during a test run and have been transferred into a table. The table is preferably stored in a memory of the analyzing unit. This memory may be updated if the need arises. This takes place in particular within the scope of the periodic maintenance of the vehicle.

According to another preferred embodiment of the present invention, the light transmitters or light receivers, situated in the back rest, are positioned at least in one row. In particular, a uniform distance between the individual members of the row is selected. This creates uniform staggering by height of the light transmitters or light receivers in the back rest, whereby a plurality of body positions may be detected. In addition, it has proven advantageous to select a lesser distance in the area of the passenger's lower back since already small modifications in the posture of the passenger in the lower area of the back cause a significant change in the head position, in particular with regard to the safe deployment of a head air bag. Therefore, it has proven advantageous to obtain highly differentiated information about the body position or the posture in the area of the lower back of the driver, which is made possible by positioning the light transmitters or light receivers in the back rest with a closer spacing in this particularly relevant area.

In addition, it has proven advantageous to position the light transmitters or light receivers in the back rest in two rows staggered by height, the two rows being positioned in a V shape in particular. Due to the greater distance between the two rows with increasing height, it is possible not only to reliably detect the inclination of the passenger, but also to detect the lateral position, in particular a sideways tilting of the driver, which is particularly important with regard to the safe deployment of a side air bag.

It has proven advantageous to position the light transmitter(s) or light receiver(s), which are situated in the receiving area of the light receiver(s) or in the illuminated area of the light transmitter, at least partially in or on the head restraint or in or on the roof liner. These positions above the back rest have been proven advantageous since they are not only easily accessible from the standpoint of assembly, but they also provide a direct visual line to the relevant area of the different sitting positions of the passenger. In particular, this allows for a plurality of possible light paths between the light transmitters and light receivers situated in the back rest, as well as between the light receivers and light transmitters situated in or on the head restraint or the roof liner, thereby making a differentiated analysis by the analyzing unit possible. In addition to positioning the light transmitters or light receivers exclusively in the head restraint or exclusively in or on the roof liner, combined positioning is also possible, especially since it makes even more differentiated information about the body position possible, in particular about the inclination of the passenger in or across the driving direction.

In addition, it has proven advantageous to design the analyzing unit as part of the seat, which creates a compact functional unit, in particular when the device according to the present invention has its light transmitters and light receivers positioned exclusively in or on the seat. In this case, the device according to the present invention and the seat form a functional unit which is jointly manufacturable and jointly exchangeable without requiring further adjustments to the particular positional geometry of the vehicle or other components of the device.

It has proven advantageous to position the analyzing unit in the area of one, in particular the only one light receiver, which makes it possible to keep the amount of wiring and the transmission path, and thus the danger of interfering effects on the transmission path between the light receiver and the analyzing unit, as small as possible, which has a positive effect on the reliability of the analysis of the light signals received.

The light transmitters and the light receivers are preferably provided with optical elements which make a target-oriented reception and emission of light signals possible, so that the interfering effects of scattered light or of interfering light which is not emitted by the device are at least limited, thereby making a reliable analysis of the light signals received possible. This takes place in particular via apertures or the selective use of convex lenses which concentrate the emitted or received light in a target-oriented manner in a certain area or which receive it only from a specific area. In addition, it has proven advantageous to use filters which only let pass light having certain frequencies, so that in this way interfering ambient light is held off from analysis. The use of a filter in the area of the light receiver is selected in such a way that it correlates with the light which is emitted by the light transmitter(s). The light transmitters may generate light having certain frequencies, for example by using LED's which emit light in a limited, narrow frequency band, or by using broadband light sources with a narrowband filter assigned to them.

It has proven advantageous to provide optical waveguides as the connection between analyzing unit and light receiver which makes an interference-free transmission possible without the effect of interfering electromagnetic radiation, with all essential electric and electro-optic functionalities combined in the analyzing unit. In addition, it has proven advantageous to provide one or more powerful light sources which transfer light to the light transmitter(s) via one or a plurality of optical waveguides, so that the area of the light transmitter may be implemented on the surface of the back rest, the head restraint, or the roof liner in a space-saving manner. Thus, an optically and haptically pleasant seat and passenger compartment are created which promotes the well-being of the passenger. In addition, the light source may be implemented at a particularly suitable location without substantial design restrictions. The decentralization of the components makes it possible to implement an optimal overall arrangement of the device without having a substantially negative effect on the appearance or the position of the seat or the passenger compartment.

It has proven advantageous to design the light receivers and the light transmitters in such a way that they operate exclusively or nearly exclusively in the non-visible area, in particular in the infrared area, since the user does not consciously notice these light signals and is therefore not disturbed. Nevertheless, it has also been proven advantageous to use light signals additionally or exclusively in the visible area.

According to a preferred embodiment of the present invention, the analyzing unit is designed in such a way that it is suitable to determine the length of the passenger's back and to take same into account particularly for determining the body position or posture and particularly for determining the head position. The length of the back is determined in particular by checking which light paths between light transmitters and light receivers are simultaneously maximally blocked. A conclusion regarding the body length is drawn using this information. If, for example, the lower ten light receivers out of a row of 15 light receivers situated in the back rest of the seat are unable to receive light, while the upper five light receivers do receive light signals, the conclusion may be, using this information, that the back length basically corresponds to the length between the highest covered light receiver and the seat surface. This observation applies systematically only to the maximum of light receivers simultaneously covered from the bottom up in a continuous row. Using this information about the back length, even a more differentiated information about the body position or posture, in particular with regard to evaluating the head position, may be obtained, since an additional differentiation is achievable based on the back length.

A further embodiment of the present invention relates to an air bag deployment unit which is provided with or connected to a device according to the present invention for detecting the body position or posture, in particular the head position. This makes it possible to control the air bag deployment unit in such a way that air bag deployment, with regard to time or deployment speed, is adapted to the head or body position, or posture detected, thereby developing an improved protection effect.

The present invention also relates to a vehicle having an above-mentioned device for detecting the body position or posture or having an above-mentioned air bag deployment unit.

BRIEF DESCRIPTION OF THE DRAWINGS

The present invention is described in the following based on exemplary embodiments, with reference to the drawings. The present invention is not limited to these embodiments.

DETAILED DESCRIPTION

Figure 1:
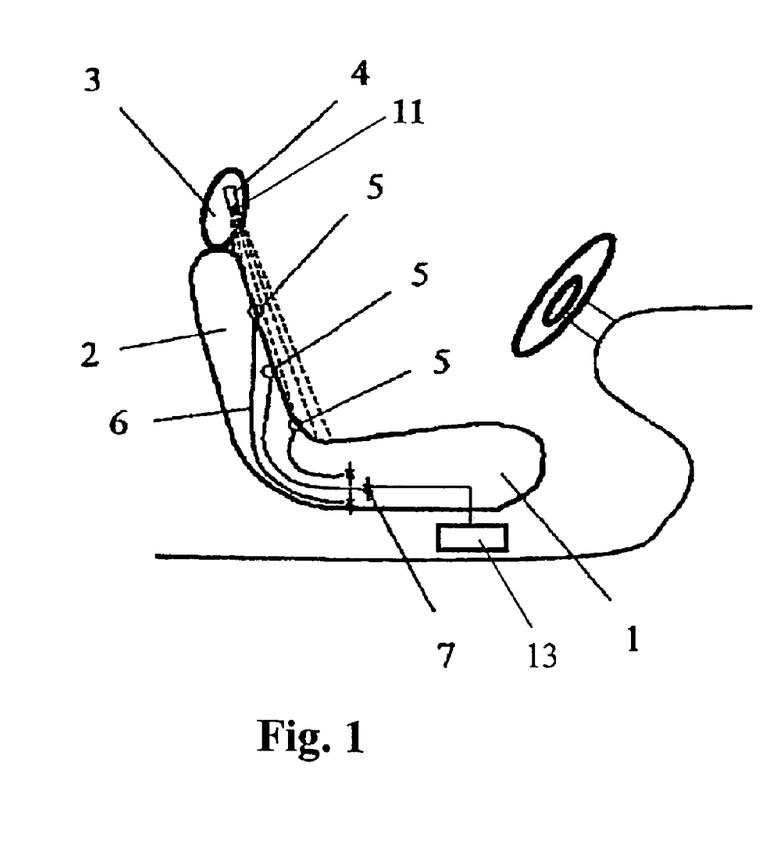
FIG. 1 shows a simplified illustration of a device for detecting the body position or posture.

FIG. 1 shows a detail of a vehicle having a driver's seat. Driver's seat 1 is composed of a seat surface, a back rest 2 and a head restraint 3. A light transmitter 4 is situated in head restraint 3 which emits light downward in the direction of back rest 2 or the seat surface of driver's seat 1. An optical element 11 associated with light transmitter 4 aligns emitted light signals. Optical element 11 is shown schematically for illustrative purposes only, not to imply shape, location etc., of the element.

A plurality of light receivers 5, staggered by height, is situated in back rest 2. For the purpose of simplification, only three light receivers 5 are illustrated in FIG. 1. Light receivers 5 are mounted on the surface of back rest 2. They are connected to an analyzing unit 7 via optical waveguides 6. Analyzing unit 7 contains photodiodes which convert light, received by light receivers 5 and relayed to analyzing unit 7 via optical waveguides 6, into electrical signals. The converted electrical signals are checked whether light having adequate light intensity does or does not arrive at the individual light receivers 5. If the light path to the lowest light receiver 5 is blocked while light receiver 5, situated directly above it, receives a light signal having sufficient light intensity, then the conclusion may be drawn that the light path between light transmitter 4 in head restraint 3 to the lowest light receiver 5 is blocked, while the light path to light receiver 5, situated directly above it, is open. From this information the conclusion may be drawn that the passenger is leaning heavily forward. The more light receivers 5 do not receive a light signal or do not receive an adequate light signal, the more is the passenger leaning against back rest 2. The body position or posture of the passenger may be detected in a simple and quite reliable manner using this information. Analyzing unit 7 is connected to airbag deployment unit 13. Airbag deployment unit 13 is shown schematically for illustrative purposes only, not to imply shape, location etc., of the unit. Based on the information about the body position, in particular about the body leaning in the direction of the steering wheel, the optimal deployment time or the optimal deployment speed of an air bag may be determined, thereby limiting the effects of an accident.

Figure 2:
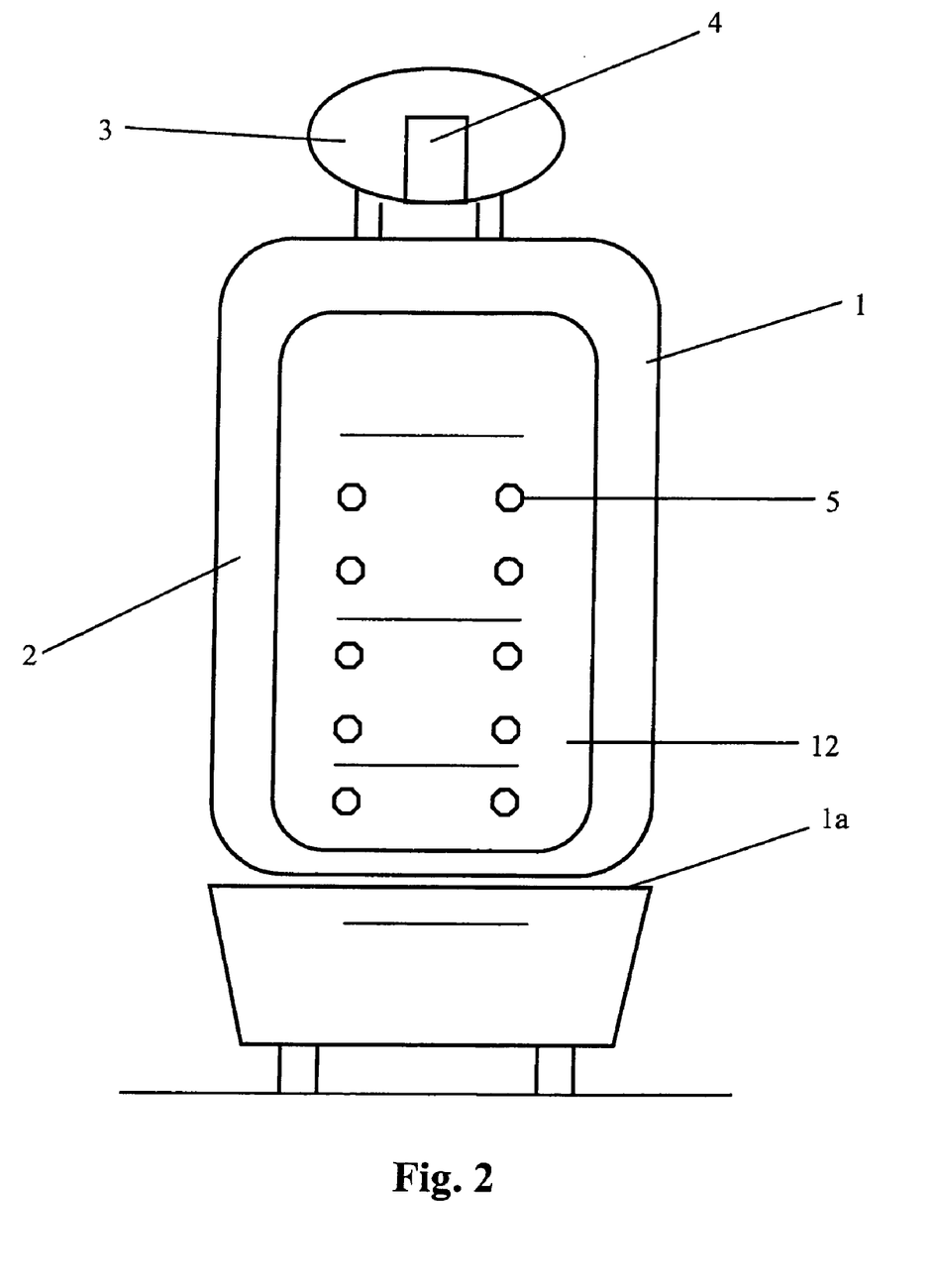
FIG. 2 shows the configuration of a seat having a device for detecting the body position or posture.

FIG. 2 shows a driver's seat 1 viewed from the front. The seat is composed of seat surface 1a, back rest 2, and head restraint 3. Light transmitter 4 is situated in head restraint 3, the light transmitter, corresponding to FIG. 1, emitting light downward in the direction of light receivers 5 situated in back rest 2. Light receivers 5 are mounted on back rest 2 in two parallel rows at different heights. They show an essentially uniform distance within the particular row. Light transmitter 4 irradiates all ten light receivers evenly. By positioning light receivers 5 in two rows, it is made possible to detect a lateral change in position of the passenger and to take this change into account with regard to the deployment of an air bag, in particular a side air bag. The uniform distance of light receivers 5 in the rows makes a visually appealing and reliable implementation of the detection of the body position or posture possible. In particular, a differentiated body inclination and thereby a body position with little body inclination may be detected just as well as a strong body inclination at which more or less light receivers do receive or do not receive a sufficient light signal depending on the body inclination.

Figure 7:
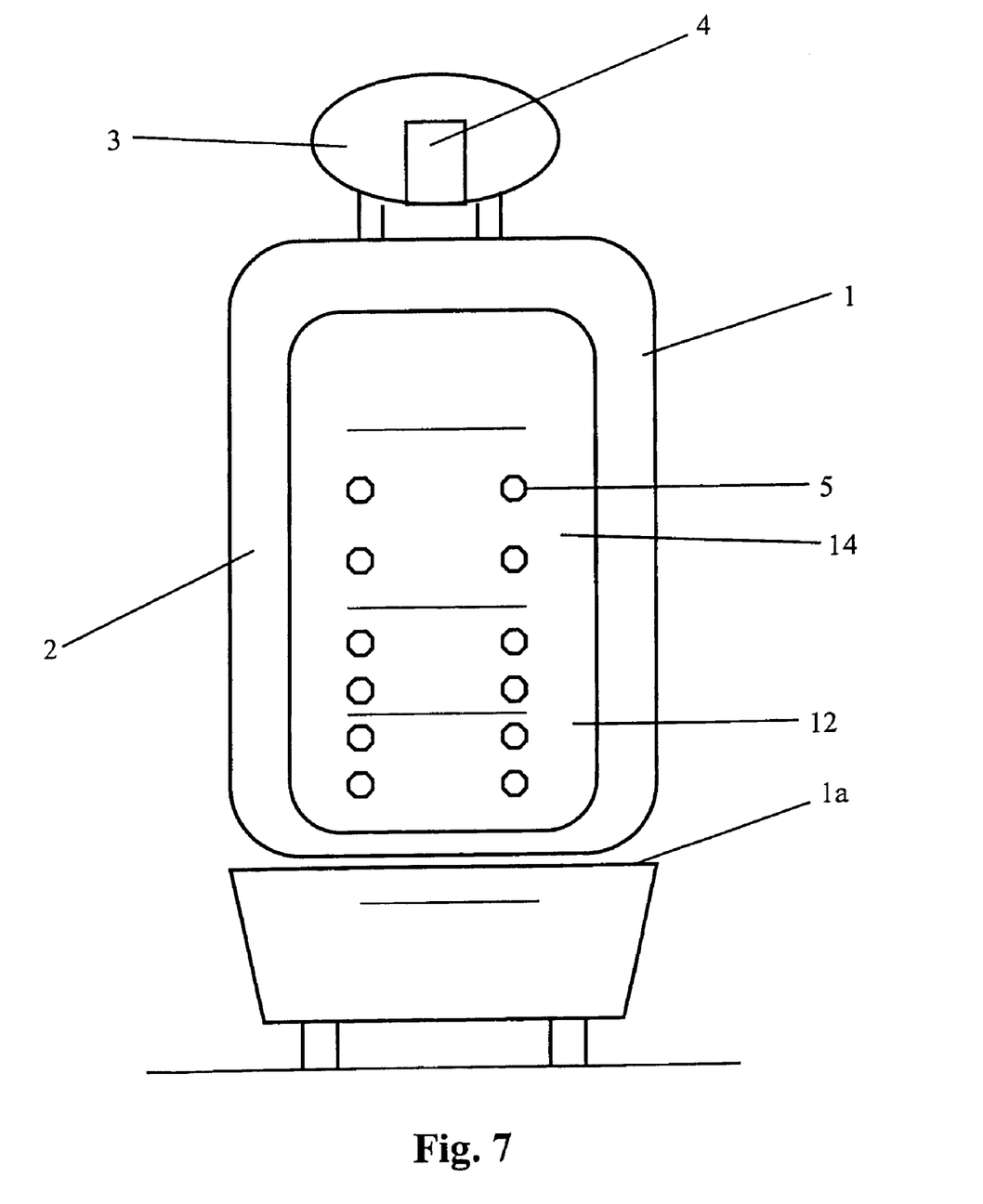
FIG. 7 shows the configuration of a seat having another device for detecting the body position or posture.

Referring to FIG. 7, in an embodiment, light receivers 5 are spaced closer together in lower area 12 of back rest 2 than in upper area 14 of the back rest. The spacing of light receivers 5 is shown schematically for illustrative purposes only, not to imply shapes, locations, etc., of the receivers.

Figure 3:
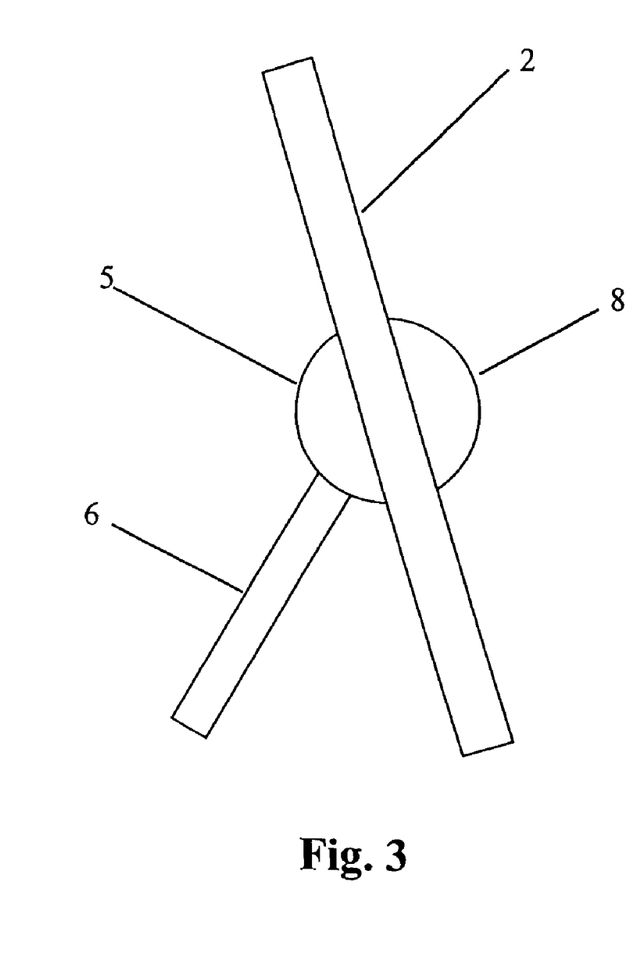
FIG. 3 shows the configuration of a light receiver.

FIG. 3 shows the structure of a light receiver 5 corresponding to FIGS. 1 and 2. Light receiver 5 is situated on the surface of back rest 2. The light receiver is connected to analyzing unit 7 via an optical waveguide 6. The light from light transmitter 4 is supplied to optical waveguide 6 via an optical element which is designed as filter 8. Filter 8 is provided with a bandpass characteristic in such a way that invisible infrared light may pass through, while visible light cannot pass through filter 8. This makes it possible to shut out interfering ambient light, for example scattered light or light from the surroundings through the side windows, from access to optical waveguide 6 and thus to analysis by analyzing unit 7, thereby making a safe, reliable analysis of the infrared light signals possible for detecting the body position or posture, in particular the body inclination. Since light receiver 5, in its appearance, is designed like a seat button, it also has an appealing esthetic effect in addition to its function as optical receiver 5.

Figure 4:
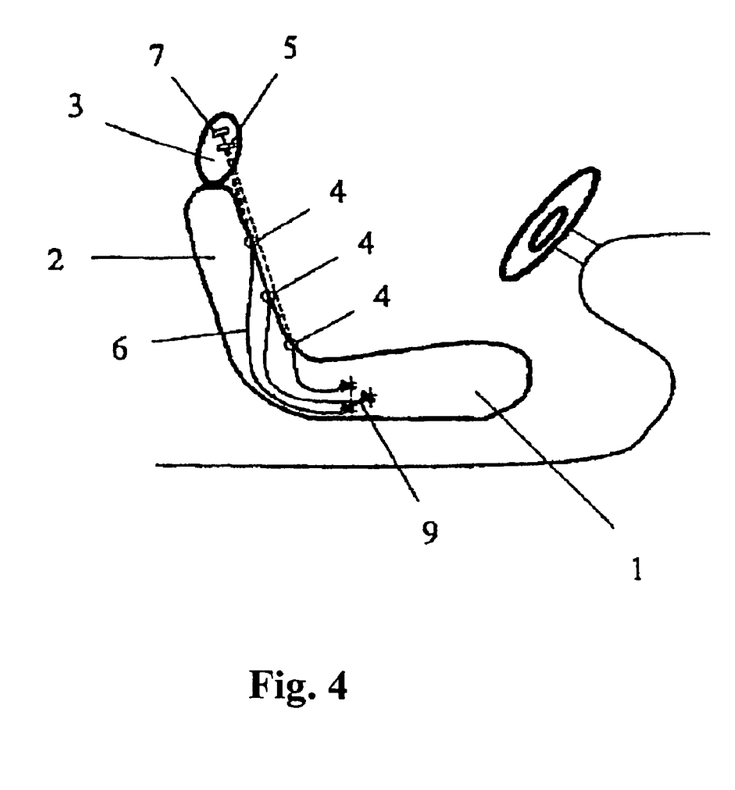
FIG. 4 shows another device for detecting the body position or posture.

FIG. 4 shows another exemplary embodiment of the present invention. A device according to the present invention is situated in driver's seat 1 having back rest 2 and head restraint 3. A light receiver 5 is situated in head restraint 3; the receiving area of the light receiver is directed downward in the direction of driver's seat 1, in particular in the direction of back rest 2. A plurality of light transmitters 4 is situated in the receiving area. These light transmitters 4 are mounted on the front of back rest 2, staggered by height. Light transmitters 4, independently of one another, emit light signals which may be picked up by light receiver 5. Each light transmitter 4 is provided with its own light source 9 via its own optical waveguide 6. Light sources 9 are each formed by light-emitting diodes. The light-emitting diodes are each provided with a characteristic modulation, so that the light signal emitted from each individual light transmitter 4 has its own characteristic modulation. Each characteristic light signal is picked up by light receiver 5 and is analyzed by an analyzing unit 7, assigned to light receiver 5, to determine which light transmitter is emitting a receivable light signal. Based on this analysis, it may be determined which light paths are blocked and which are open. Based on the light paths blocked, a conclusion may be drawn regarding the body position, i.e., the position of the body blocking the light paths. Analyzing unit 7 is situated in the immediate proximity of the light receiver in head restraint 3. This makes possible a compact unit composed of the light receiver and analyzing unit 7 which are accommodated in the head restraint as a functional unit. An easy exchange, replacement, and repair of head restraint 3 including analyzing unit 7 and light receiver 5 is thus possible.

Figure 8:
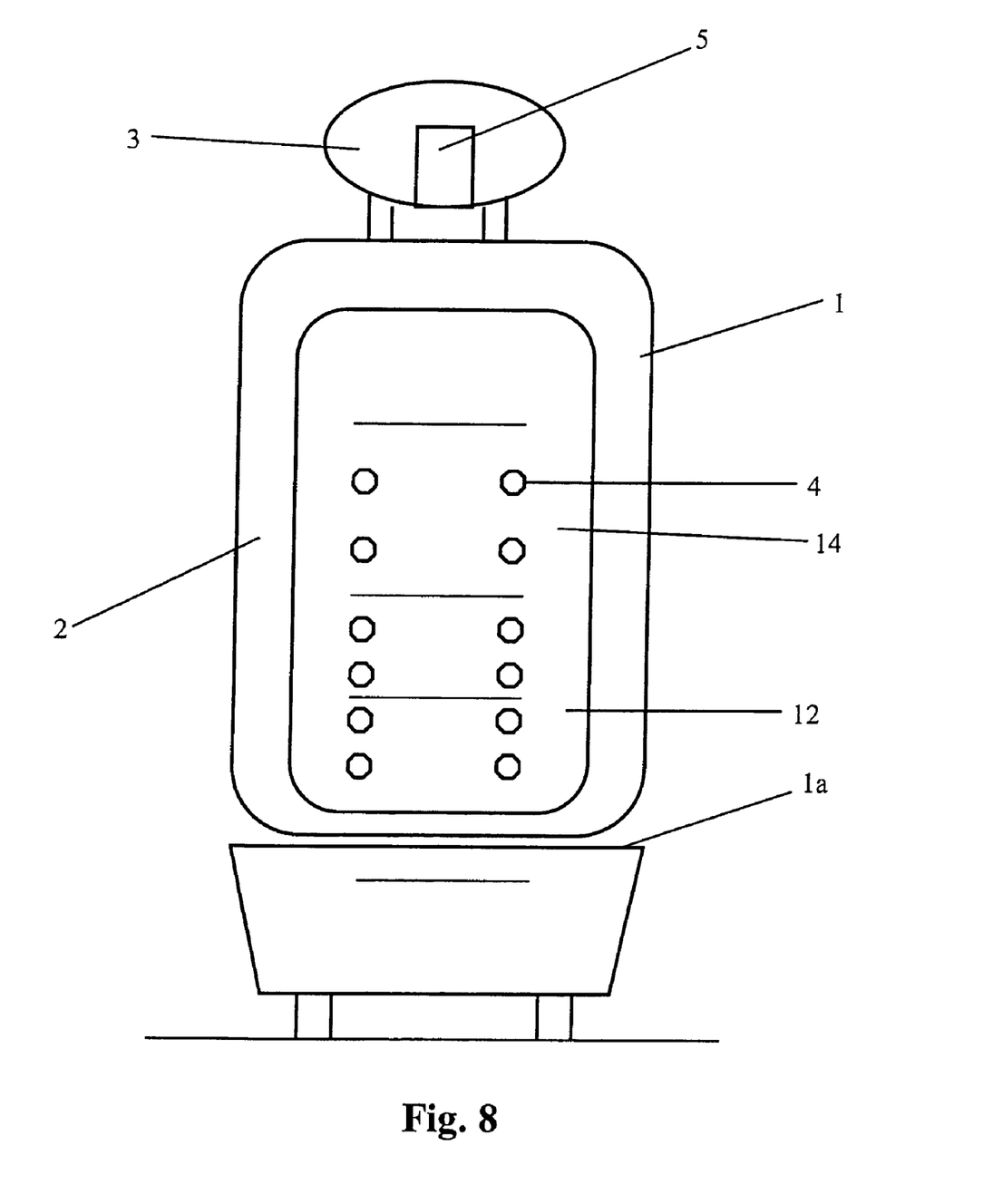
FIG. 8 shows the configuration of a seat having another device for detecting the body position or posture.

Referring to FIG. 8, in an embodiment, plurality of light transmitters 4 are spaced closer together in lower area 12 of back rest 2 than in upper are 14 of the back rest. The spacing of light transmitters 4 is shown schematically for illustrative purposes only, not to imply shapes, locations, etc., of the transmitters.

Figure 9:
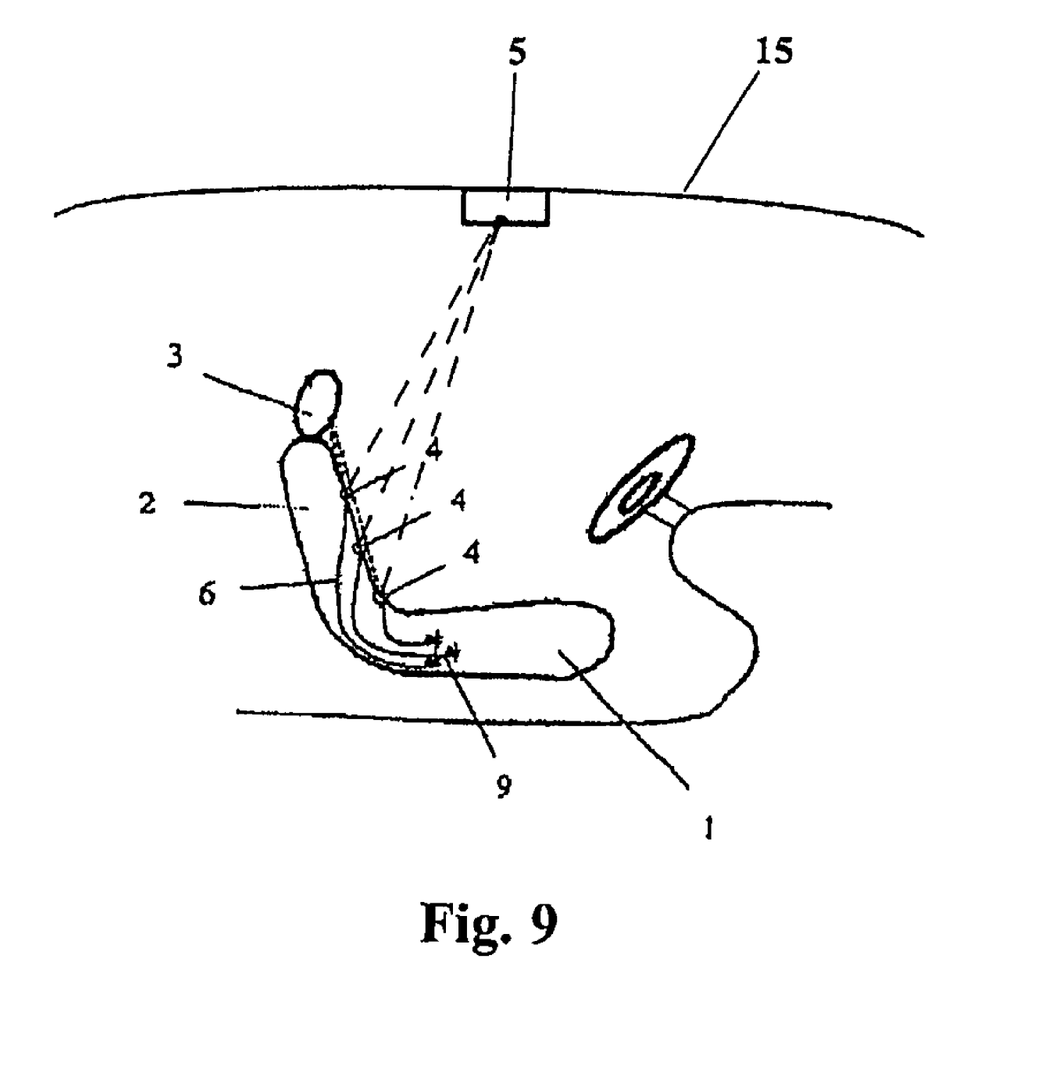
FIG. 9 shows another device for detecting the body position or posture.

Referring to FIG. 9, in an embodiment, light receiver 5 is situated in roof liner 15. Light receiver 5 and roof liner 15 are shown schematically for illustrative purposes only, not to imply shapes, locations, etc., of the light receiver and roof liner.

Figure 10:
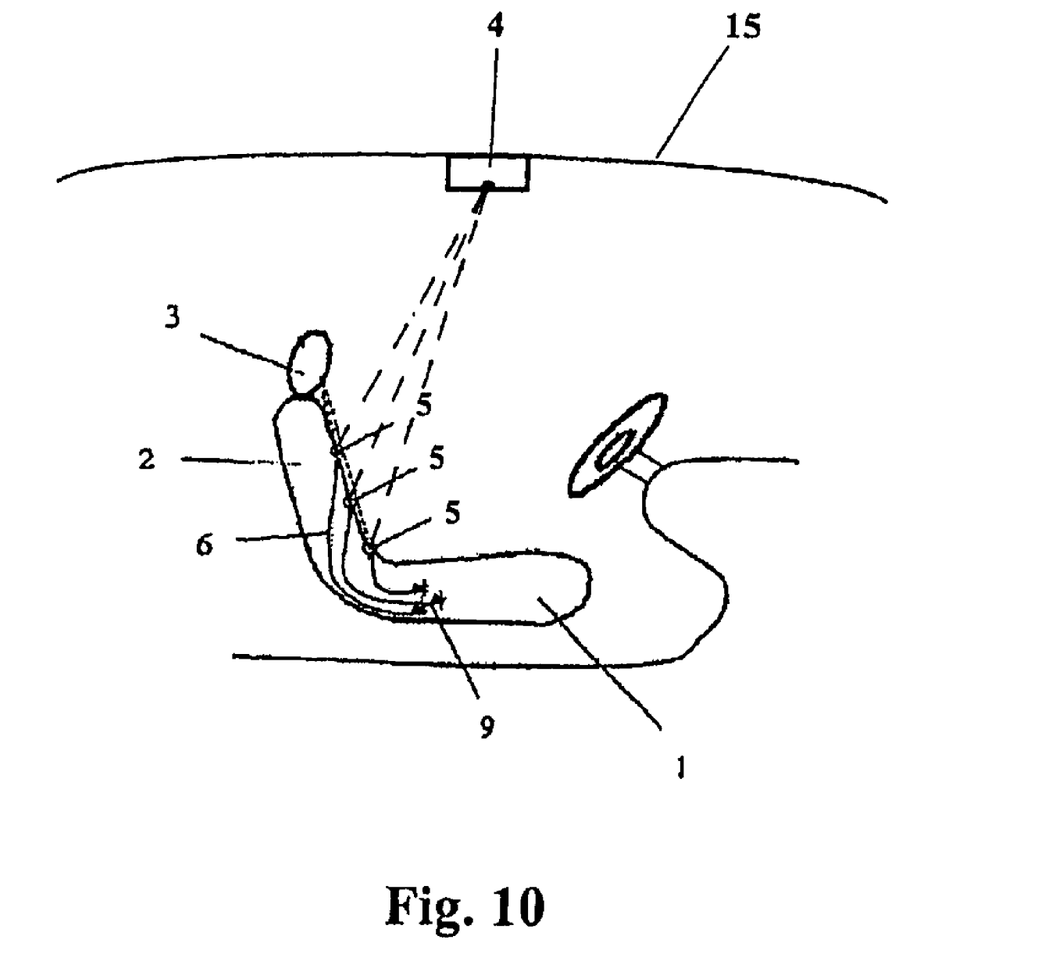
FIG. 10 shows another device for detecting the body position or posture.

Referring to FIG. 10, in an embodiment, light transmitter 4 is situated in roof liner 15, with plurality of light receivers 5 situated in back rest 2. Light transmitter 4 and roof liner 15 are shown schematically for illustrative purposes only, not to imply shapes, locations, etc., of the light transmitter and roof liner.

Figure 5:
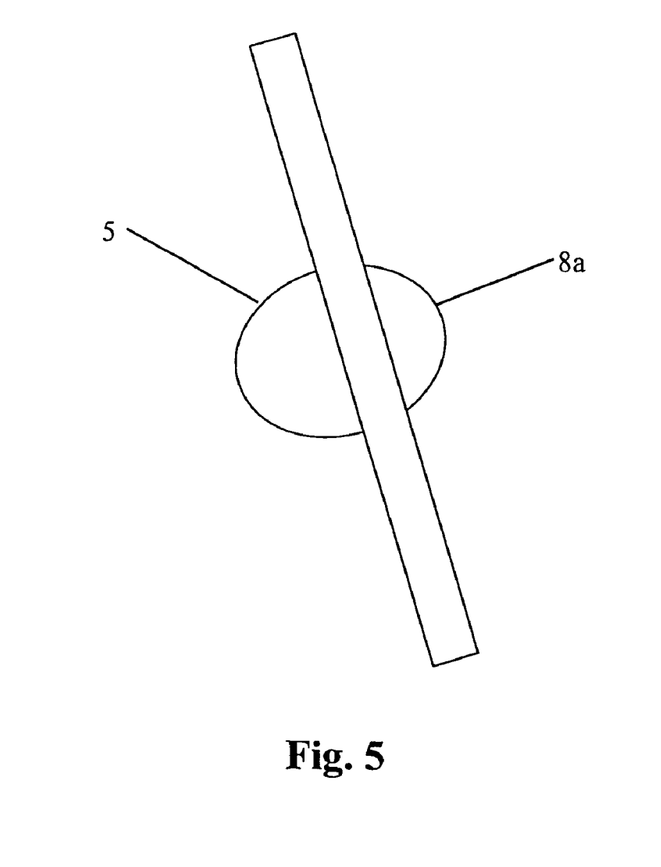
FIG. 5 shows the configuration of a light transmitter.

An exemplary structure of a light receiver 5, corresponding to the structure illustrated in FIG. 3, is rendered in FIG. 5. An optical element in the form of a convex lens 8a is assigned to light receiver 5. The light picked up and concentrated by the convex lens is supplied to a photodiode which converts the light signals into electrical signals, and the converted electrical signals are subsequently transmitted to analyzing unit 7 via electric lines. The illustrated light receiver 5 has a compact construction which may be advantageously integrated into a head restraint 3 and may perform its task there without affecting the function of the head restraint. In order to safely ensure this, convex lens 8a is made of a soft material or is enclosed in a soft material so that there is no danger of an injury through an impact of the head on the light receiver.

Figure 11:
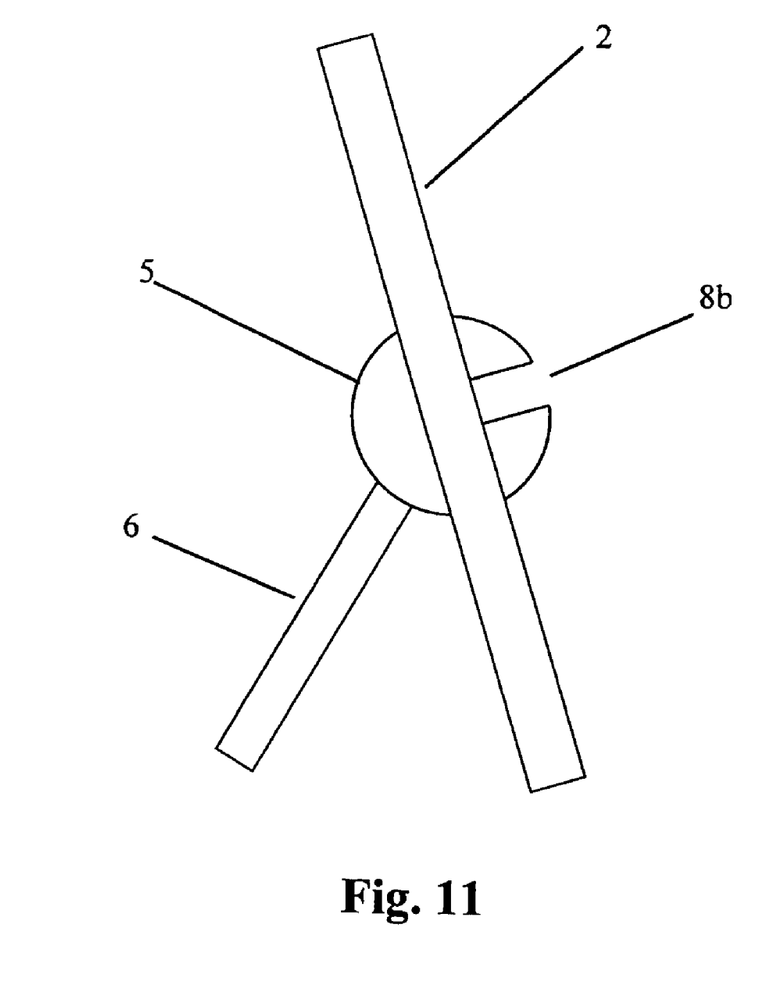
FIG. 11 shows the configuration of another light receiver.

Referring to FIG. 11, in an embodiment, an optical element in the form of an aperture 8b is assigned to light receiver 5. Aperture 8b is shown schematically for illustrative purposes only, not to imply the shape, location, etc., of the aperture.

Figure 6:
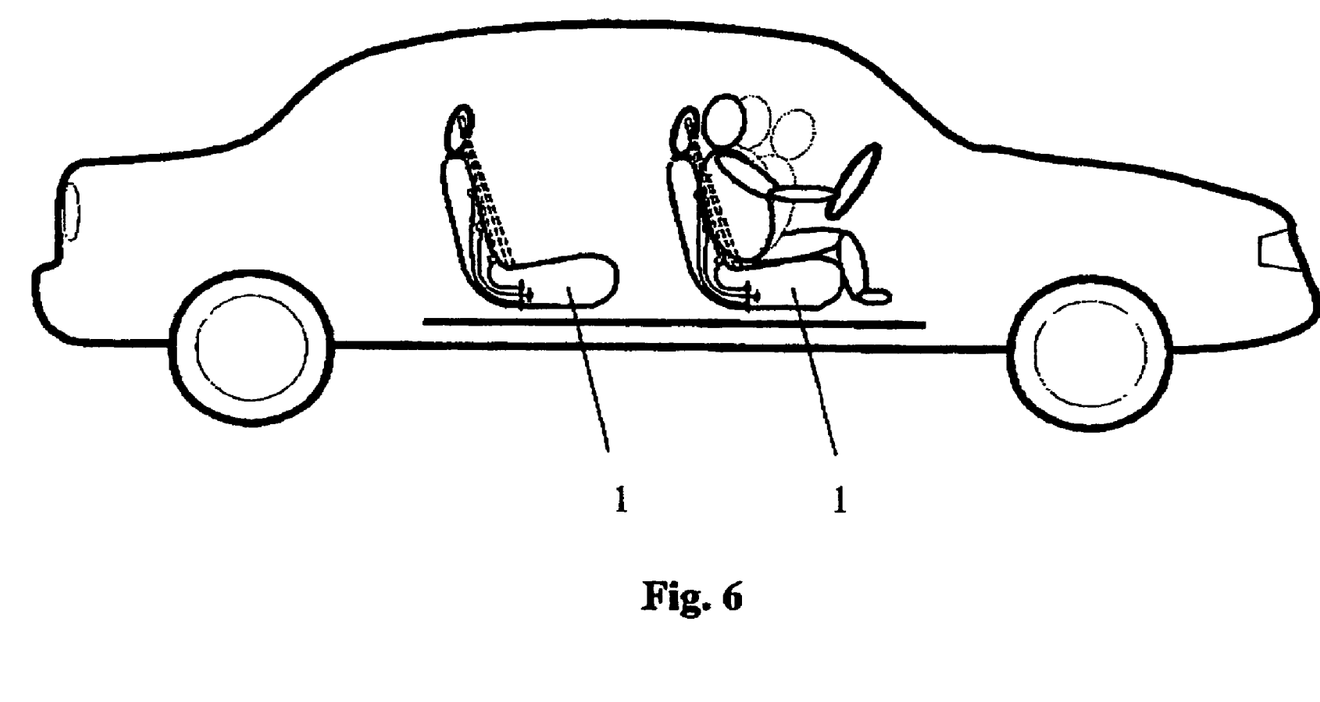
FIG. 6 shows a vehicle having two devices for detecting the body position or posture.

FIG. 6 shows a simplified drawing of the configuration of a vehicle according to the present invention. It shows two seats, one driver's seat and a seat in the rear. These two seats correspond in their configuration to seat 1 illustrated in FIG. 1.

A passenger having three different body positions or postures is depicted on the driver's seat. The solid-line drawing shows the driver in a correct body position or posture and thus in a correct sitting position. The light paths between the light receivers in the back rest of the seat and the light transmitter in the head restraint of the seat are all blocked. The light receivers do not receive light due to this blockage. The analyzing unit detects this and interprets this as a correct sitting position which would cause a standard deployment of the air bag system situated in the steering wheel of the vehicle.

It is noticeable in the more forward leaning positions, depicted with dashed lines, that a varying number of light paths is blocked as a function of the particular body inclination of the driver and thus as a function of the body position or posture. These blockages are analyzed by the analyzing unit and are interpreted as differentiated body inclination, i.e., a different body position or posture. Based on this interpretation result, the air bag deployment unit assigned to the device for detecting the body position or posture is controlled in such a way that the deployment time or the deployment speed are adapted in such a way that injury to the passenger is kept as light as possible.

By using the device described for detecting the body position or posture it is also possible to discern in a simple manner whether a seat is actually occupied or not. Within the scope of the analysis it is possible to discern whether individual light paths are blocked, and if so, which light paths are blocked. To achieve this, in particular light transmitter-individualized light signals are emitted which, by using a particular analyzer circuit, e.g., demodulator circuits or detector circuits, make individualized detection of individual light signals possible. By using such individualized light signals in connection with detection of the light signals by the analyzer circuit, differentiated and reliable information about the body position or posture may be obtained. In particular, information about the inclination of the body, in both the forward and sideways directions, may be obtained.

Typically, the analyzing unit performs a comparison of the light signals received with light signals expected (reference values) to which body positions or postures, known from an earlier analysis, are assigned. The particular body positions or postures are made available for transmission to other components of the vehicle. The information of the known light signal combinations expected with respect to the known body positions or postures assigned to them is stored in a reference memory situated in the analyzing unit, the reference memory being regularly checked or updated during maintenance service. In particular, changes in the body measurements and thus changes in the head or body positions or postures, and as a result also changes in the light signals expected in connection with the body positions or postures expected, are taken into account within the scope of these updates.

The present invention described makes a simple and reliable detecting of the body position or posture possible, in particular the head position and the body inclination of a passenger sitting in a seat having a back rest based on the blockage of different light propagation paths to one or a plurality of light receiver(s) in the area of the seat.

What is claimed is:

1. A method of detecting the body position of a passenger in a vehicle sitting in a seat, comprising:
    emitting light signals using a plurality of light transmitters, wherein the light signals emitted by the light transmitters are light transmitter-individualized;
    receiving the light signals using at least one light receiver disposed in an area illuminated by the light transmitters; and
    drawing a conclusion regarding a posture of the passenger based on whether a first light signal of the light signals is received by the at least one light receiver or blocked between a first of the plurality of light transmitters and the at least one light receiver.

2. The method as recited in claim 1 wherein the posture of the passenger includes at least one of a body inclination and a head position of the passenger.

3. The method as recited in claim 1 wherein the plurality of light transmitters are disposed at different heights and the drawing the conclusion is performed based on the respective height of the first light transmitter.

4. A device for detecting the body position of a passenger in a vehicle sitting in a seat having a back rest, the device comprising:
    a plurality of light transmitters disposed at different heights on or in the back rest and configured to emit light signals;
    at least one light receiver disposed in an area illuminated by the light transmitters and configured to receive the light signals; and
    an analyzing unit configured to analyze at least one received light signal of the light signals so as to enable a conclusion to be drawn regarding a posture of the passenger based on the type or the intensity of the at least one received light signal;
    wherein the light signals emitted by the light transmitters are light transmitter-individualized.

5. The device as recited in claim 4 wherein the light signals emitted by the light transmitters are light transmitter-individualized by at least one of a time of light transmission and a light signal characteristic.

6. The device as recited in claim 5 wherein the light signal characteristic includes at least one of a frequency, a modulation and pause length-to-pulse length ratio.

7. The device as recited in claim 4 wherein the light transmitters are disposed in at least one row.

8. The device as recited in claim 7 wherein the light transmitters are spaced closer in a lower area of the back rest than in an upper area of the back rest.

9. The device as recited in claim 4 wherein the at least one light receiver is disposed at least partially in or on a roof liner of the vehicle.

10. The device as recited in claim 4 wherein the analyzing unit is disposed on or in the seat.

11. The device as recited in claim 4 wherein the analyzing unit is disposed in an area of the at least one light receiver.

12. The device as recited in claim 4 wherein the analyzing unit includes a memory for reference values for comparing the at least one received light signal with at least one known light signal so as to determine the body posture.

13. The device as recited in claim 4 further comprising at least one optical element associated with the at least one light receiver.

14. The device as recited in claim 13 wherein the at least one optical element includes at least one of a convex lens, an aperture, and a filter.

15. The device as recited in claim 4 further comprising at least one optical element associated with at least one of the light transmitters for aligning light of the emitted light signals emitted in a direction of the at least one light receiver.

16. The device as recited in claim 4 wherein the at least one light receiver is connected to the analyzing unit via at least one optical waveguide.

17. The device as recited in claim 4 wherein at least one of the light transmitters is connected to a light source via an optical waveguide.

18. The device as recited in claim 4 wherein the analyzing unit is configured to detect at least one of a body length and a back length of the passenger.

19. The device as recited in claim 4 wherein the light signals include at least one of visible light and invisible light.

20. The device as recited in claim 19 wherein the light signals include infrared light.

21. The device as recited in claim 4 wherein the at least one light receiver is disposed above the light transmitters.

22. The device as recited in claim 4 wherein the posture includes at least one of a body inclination and a head position of the passenger.

23. The device as recited in claim 4 wherein the device is connected to an air bag deployment apparatus.

24. The device as recited in claim 4 wherein the device is disposed in the vehicle.

25. The device as recited in claim 4 wherein the analyzing unit is configured to analyze the at least one received light signal so as to enable the conclusion to be drawn regarding the posture of the passenger based on the respective height of the respective light transmitter corresponding to the at least one received light signal.

26. A device for detecting the body position of a passenger in a vehicle sitting in a seat having a back rest, the device comprising:

at least one light receiver disposed in or on the back rest and configured to receive light signals;

an analyzing unit configured to analyze at least one received light signal of the light signals so as to enable a conclusion to be drawn regarding a posture of the passenger based on the type or the intensity of the at least one received light signal; and a plurality of light transmitters configured to emit the light signals, wherein the light signals emitted by the light transmitters are light transmitter-individualized.

27. The device as recited in claim 26 wherein the posture includes at least one of a body inclination and a head position of the passenger.

28. The device as recited in claim 26 wherein the plurality of light transmitters is disposed above the at least one light receiver.

29. The device as recited in claim 26 wherein the signals emitted by the plurality of light transmitters are light transmitter-individualized by at least one of a time of light transmission and a light signal characteristic.

30. The device as recited in claim 29 wherein the light signal characteristic includes at least one of a frequency, a modulation and pause length-to-pulse length ratio.

31. The device as recited in claim 26 wherein the at least one light receiver includes a plurality of light receivers disposed in at least one row at different heights.

32. The device as recited in claim 31 wherein the light receivers are spaced closer in a lower area of the back rest than in an upper area of the back rest.

33. The device as recited in claim 31 wherein the analyzing unit is configured to analyze the at least one received light signal so as to enable the conclusion to be drawn regarding the posture of the passenger based on a height of a first of the plurality of light receivers receiving the at least one received light signal.

34. The device as recited in claim 26 wherein the plurality of light transmitters are disposed at least partially in or on a roof liner of the vehicle.

35. The device as recited in claim 26 wherein the analyzing unit is disposed on or in the seat.

36. The device as recited in claim 26 wherein the analyzing unit is disposed in an area of the at least one light receiver.

37. The device as recited in claim 26 wherein the analyzing unit includes a memory for reference values for comparing the at least one received light signal with at least one known light signal so as to determine the body posture.

38. The device as recited in claim 26 further comprising at least one optical element associated with the at least one light receiver.

39. The device as recited in claim 38 wherein the at least one optical element includes at least one of a convex lens, an aperture, and a filter.

40. The device as recited in claim 26 further comprising at least one optical element associated with the plurality of light transmitters for aligning light of the emitted light signals emitted in a direction of the at least one light receiver.

41. The device as recited in claim 26 wherein the at least one light receiver is connected to the analyzing unit via at least one optical waveguide.

42. The device as recited in claim 26 wherein the plurality of light transmitters is connected to a light source via an optical waveguide.

43. The device as recited in claim 26 wherein the analyzing unit is configured to detect at least one of a body length and a back length of the passenger.

44. The device as recited in claim 26 wherein the light signals include at least one of visible light and invisible light.

45. The device as recited in claim 44 wherein the light signals include infrared light.

46. The device as recited in claim 26 wherein the device is connected to an air bag deployment apparatus.

47. The device as recited in claim 26 wherein the device is disposed in the vehicle.

48. A device for detecting the body position of a passenger in a vehicle sitting in a seat having a back rest, the device comprising:
- a plurality of light transmitters disposed at different heights on or in the back rest and configured to emit light signals;
- at least one light receiver disposed in an area illuminated by the light transmitters and configured to receive the light signals; and
- an analyzing unit configured to analyze at least one received light signal of the light signals so as to enable a conclusion to be drawn regarding a posture of the passenger based on the type or the intensity of the at least one received light signal;
- wherein the at least one light receiver is disposed at least partially in or on a head restraint of the seat.

49. A device for detecting the body position of a passenger in a vehicle sitting in a seat having a back rest, the device comprising:
- at least one light receiver disposed in or on the back rest and configured to receive light signals;
- at least one light transmitter disposed in a transmitting area defined by the at least one light transmitter and configured to emit the light signals; and
- an analyzing unit configured to analyze at least one received light signal of the light signals so as to enable a conclusion to be drawn regarding a posture of the passenger based on the type or the intensity of the at least one received light signal;
- wherein the at least one light transmitter is disposed at least partially in or on a head restraint of the seat.

* * * * *